United States Patent [19]

Franz

[11] Patent Number: 6,026,344
[45] Date of Patent: Feb. 15, 2000

[54] DIAGNOSIS METHOD FOR VEHICLE SYSTEMS

[75] Inventor: Martin P. Franz, Kalamazoo, Mich.

[73] Assignee: SPX Corporation, Muskegon, Mich.

[21] Appl. No.: 08/800,780

[22] Filed: Feb. 13, 1997

[51] Int. Cl.$^7$ .................................................. G06F 17/21
[52] U.S. Cl. ................................ 701/102; 701/1; 701/35; 73/116
[58] Field of Search .................................. 701/102, 1, 24, 701/25, 26, 35, 39, 58, 63, 65, 70, 214, 215; 73/116, 117.2, 117.3, 118.1

[56] References Cited

U.S. PATENT DOCUMENTS

| | | | |
|---|---|---|---|
| 4,325,251 | 4/1982 | Kanegae | 73/117.3 |
| 4,373,186 | 2/1983 | Marshall et al. | 364/551 |
| 4,787,040 | 11/1988 | Ames et al. | 701/1 |
| 4,980,845 | 12/1990 | Govekar | 364/550 |
| 5,010,487 | 4/1991 | Stonehocker | 364/424.03 |
| 5,041,976 | 8/1991 | Marko et al. | 364/424.03 |
| 5,079,707 | 1/1992 | Bird et al. | 701/35 |
| 5,278,759 | 1/1994 | Berra et al. | 701/1 |
| 5,473,540 | 12/1995 | Schmitz | 701/1 |
| 5,523,948 | 6/1996 | Adrain | 701/1 |
| 5,568,388 | 10/1996 | Schnerer et al. | 701/1 |
| 5,631,831 | 5/1997 | Bird et al. | 73/116 |
| 5,787,366 | 7/1998 | Adams | 701/1 |

OTHER PUBLICATIONS

Armano, G., et al., Empirical and Functional Knowledge in an Expert Sytsem for Fault Diagnosis, 1988, pp. 109–114.

Aim Demonstration Package, 1991, Abtech Corporation.

*Primary Examiner*—George Dombroske
*Attorney, Agent, or Firm*—Kinney & Lange

[57] ABSTRACT

A vehicle diagnostic system has a processor unit designed to be coupled to the vehicle to receive signals from the vehicle. The processing unit is connected to a long-term memory that stores instructions to be executed by the processing unit. The long-term memory also stores display values capable of being translated into a perceivable output. The instructions stored in the long-term memory include coding objects of a first type that are capable of calling other coding objects of the first type during execution. A random access memory is also coupled to the processing unit to receive a copy of some instructions stored in the long-term memory. At least one coding object of the first type copied into the random access memory includes a reference to a display value stored in long-term memory. The display value is copied into a display portion of the random access memory during execution and is retrieved by a user interface coupled to the random access memory. The user interface is capable of creating a perceivable output based upon the retrieved display values.

22 Claims, 9 Drawing Sheets

DIAGNOSIS METHOD FOR VEHICLE SYSTEMS

BACKGROUND OF THE INVENTION

The present invention relates to vehicle diagnostic systems and methods for analyzing vehicle attributes. In particular, the present invention relates to an object oriented approach to vehicle diagnostics.

Vehicle diagnostics involves identifying one or more faults in a vehicle. Since a vehicle is a complex combination of sub-systems, vehicle diagnosis can be difficult. In particular, the fact that many sub-systems are dependent on other sub-systems makes it difficult to isolate some faults in a vehicle. For instance, the ignition sub-system, which generates and distributes sparks to the engine, is dependent on the electrical sub-system that provides electrical voltage and current to the entire vehicle. If the ignition system is not working properly, the fault may be in the electrical system and not the ignition system.

To try to isolate faults in this complex system, the prior art has developed computer based systems that employ one of several fault detection methods. In one method, a computer is able to "learn" to associate specific vehicle faults with a collection of signals measured from the vehicle. After "learning" this association, the system could provide a likely vehicle fault based on a collection of test signals. In another system, a vehicle fault was determined using a "top-down" approach. The system would begin with the base fault that the vehicle was faulty. From this beginning, the system subdivided the vehicle into component parts until reaching a specific singular fault.

A method of particular interest to the present invention was disclosed in U.S. application Ser. No. 08/548,966, U.S. Pat. No. 5,631,831 entitled DIAGNOSIS METHOD FOR VEHICLE SYSTEMS, which was filed by John A. Bird et al. on Aug. 8, 1995. This method uses an objected-oriented approach that first selects a root fault evaluation tool. The root fault evaluation tool is a coding object that calls a number of other coding objects for its evaluation. These coding objects perform individual evaluations by calling other coding objects and/or by analyzing input signals from the vehicle. The Bird et al. system first expands all objects called, either directly or indirectly, by the root object. Once expanded, the objects are executed, beginning with the objects that did not evoke the execution of other objects and ending with the execution of the root object.

The Bird et al. system provides improved system flexibility because each object's operation is independent of the object that calls it. This allows different objects to call each other without requiring that they perform special functions before invoking another object. It also reduces the time and effort needed to correct an error in the diagnosis system because each object can be tested independently. In addition, the expansive nature of Bird et al., allows the system to detect multiple faults during the determination of the root fault. This differs from earlier systems which were only able to determine a singular fault.

However, since a single object in Bird et al. can be called by more than one other object, it is difficult to control communications between specific coding objects and the user. For instance, if every coding object creates a message when it executes, a message produced by an object may be duplicated if the object is called several times during the expansion of a root object. In addition, the expansion of a large number of objects under a root object would cause a large number of unwanted messages to be displayed.

Moreover, including messages in each coding object of Bird et al. is undesirable because such messages occupy a significant amount of memory. Since these coding objects must be loaded into a random access memory before execution, including messages in each coding object would increase the amount of random access memory needed by the system, and thus increase the cost of the vehicle diagnostic system.

SUMMARY OF THE INVENTION

The present invention is a vehicle diagnostic system that connects to a vehicle to receive signals from the vehicle. The system includes a processing unit to execute instructions for diagnosing faults in the vehicle. The instructions executed by the processing unit are stored in a random access memory that receives a copy of the instructions from a long-term memory. The instructions include coding objects that are capable of calling other coding objects during execution. At least one of the coding objects that is copied into the random access memory includes a reference to a display value stored in long-term memory. This reference, called a display identifier, is used to copy a display value from the long-term memory to a display portion of the random access memory during execution of the copied instructions. A user interface, coupled to the random access memory, retrieves the values stored in the display portion of the random access memory and uses these display values to create a perceivable output.

The coding objects preferably include a state field. The state field indicates whether the coding object has been previously executed and indicates the results of that execution. If the state field indicates that the coding object has been previously executed, the coding object is not executed again and the state field is returned to the calling instruction. If a coding object needs to be reevaluated, the state field of the coding object may be reset to indicate that the coding object has not been executed. Several coding objects can be reset at once by referring to a coding object group name. A coding object group name is a pointer at the top of a linked list of coding objects. Simply by identifying the coding object group name, the state field in every coding object within the linked list can be reset.

In preferred embodiments, the text identifier retrieved from a coding object is dependent on the value of the object's state. When the coding object's state has a first value, a first display identifier is retrieved from the coding object. When the coding object's state has a second value, a second display identifier is retrieved.

The coding objects described above are referred to as DOTs in the present application. The present invention also includes a second type of coding object, known as a SCREEN, that causes a plurality of display values to be delivered to the display portion of the random access memory. The plurality of display values includes at least one display value represented directly in the SCREEN. The plurality of display values also includes at least one display value represented by a display identifier produced by the execution of a DOT. SCREENs are used to produce a user interface screen on the display and to control the number and types of messages produced during the evaluation of coding objects called by a SCREEN.

Through its various embodiments, the present invention is able to exploit the advantages of object oriented vehicle diagnostic methods while maintaining control over the messages produced by the objects. In addition, by separating the message text from the objects, the present invention is able to reduce the amount of random access memory required and thus is able to reduce the cost of the vehicle diagnostic system.

DETAILED DESCRIPTION OF THE PREFERRED EMBODIMENTS

Figure 1:
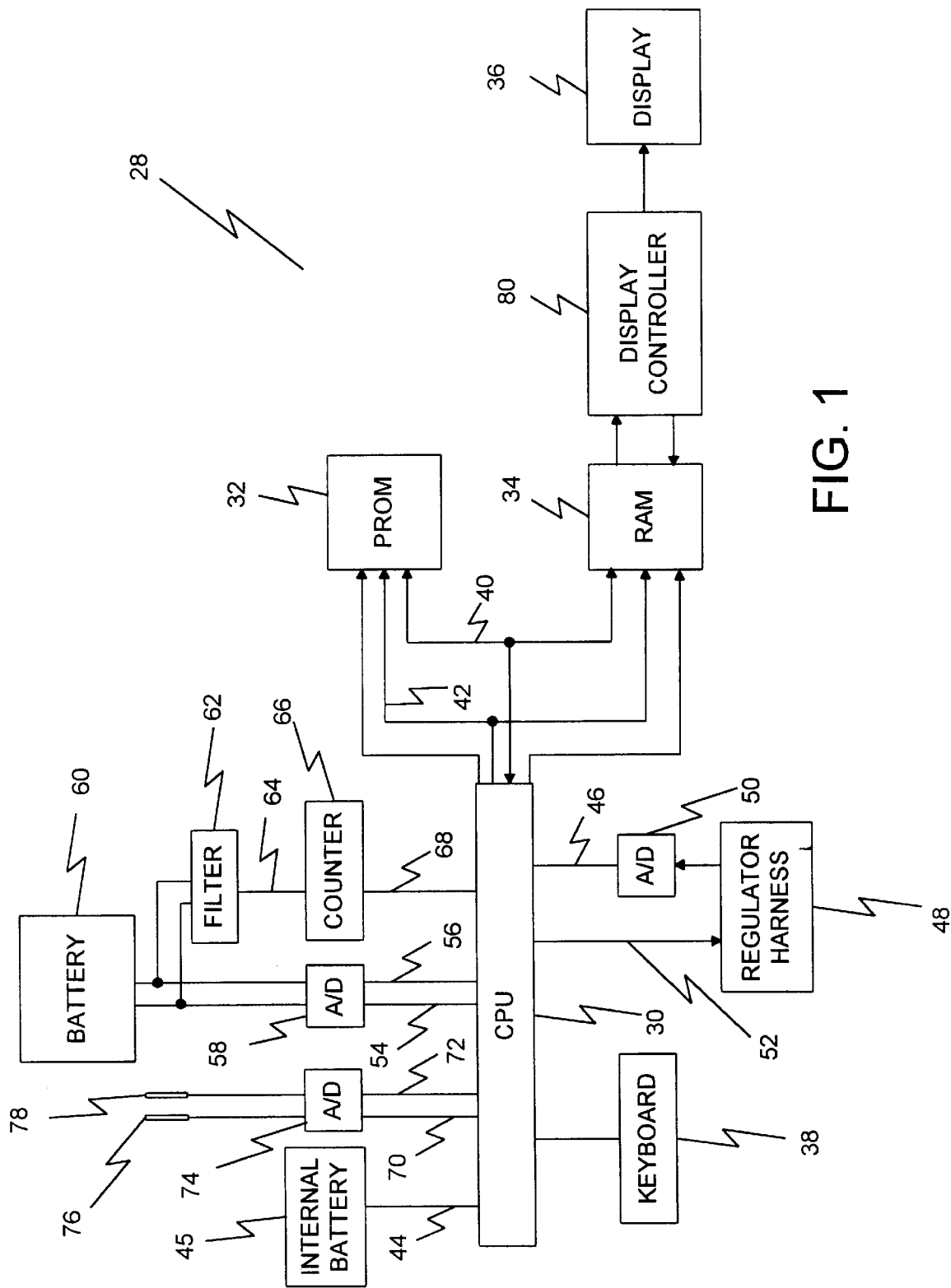
FIG. 1 is a block diagram of a vehicle diagnostic system of the present invention.

FIG. 1 is a block diagram of a vehicle diagnostic system 28 of the present invention. The core elements of vehicle diagnostic system 28 are central processing unit (CPU) 30, programmable read-only memory (PROM) 32, random access memory (RAM) 34, display 36 and keyboard 38. Instructions for vehicle diagnostic system 28 are programmed into PROM 32, such that the instructions remain intact even when vehicle diagnostic system 28 loses power.

When vehicle diagnostic system 28 is initially started, or "booted up", a set of instructions from PROM 32 is copied into RAM 34 by CPU 30. After copying, CPU 30 begins executing the instructions stored in RAM 34. The instructions are delivered to CPU 30 along data bus 40, which is connected to PROM 32, RAM 34, and CPU 30. The instructions are retrieved based on addresses placed on address bus 42, which is also connected to PROM 32, RAM 34, and CPU 30.

Some of the instructions executed by CPU 30 require external signals from the vehicle being diagnosed. Other instructions require input from keypad 38. To accommodate these instructions, CPU 30 is able to receive a variety of inputs.

For instance, one input received by CPU 30 is internal battery lead 44, which monitors the voltage level of vehicle diagnostic system 28's internal battery 45. Internal battery 45 is used to power vehicle diagnostic system 28 when the system is disconnected from an external power source. CPU 30 uses a signal on internal battery lead 44 to determine the condition of internal battery 45. If the battery's voltage is low, CPU 30 sends a message to display 36 requesting that the user connect the diagnostic system to an external power source.

CPU 30 also receives regulator harness input 46, which is received from regulator harness 48 via analog-to-digital converter 50. Regulator harness 48 is used during testing of a vehicle's electrical system. It is connected to the vehicle's alternator to test the performance of the alternator and is controlled by CPU 30 through control line 52.

During electrical testing, CPU 30 also receives positive battery terminal lead 54 and negative battery terminal lead 56. Positive battery terminal lead 54 and negative battery terminal lead 56 are connected through analog-to-digital converter 58 to the respective positive and negative terminals of battery 60. Positive battery terminal lead 54 and negative battery terminal lead 56 are used by CPU 30 to determine the voltage at the two terminals of battery 60.

The two terminals of battery 60 are also connected to filter 62, which isolates a ripple found in the voltage difference between the two terminals. Filter 62 produces filtered signal 64 which is input to counter\timer 66. Counter\timer 66 calculates the time between peaks in the ripple of filtered signal 64. The time between peaks is provided to CPU 30 along counter bus 68. Based on the value on counter bus 68, CPU 30 is able to determine a performance characteristic of the alternator.

CPU 30 also receives positive probe input 70 and negative probe input 72, which both carry digital signals from analog-to-digital converter 74. Analog-to-digital converter 74 creates digital signals on positive probe input 70 and negative probe input 72 from analog signals received from external positive probe 76 and external negative probe 78, respectively. External positive probe 76 and external negative probe 78 can be connected to any one of a plurality of electrical elements in a vehicle to test the electrical characteristics of the element.

Although vehicle diagnostic system 28 has been described in terms of connections to the electrical system of a vehicle, other connections are possible to test other components of the vehicle. These other connections include a connection to the spark plug in the number one cylinder; to the primary winding of the engine's ignition to receive a low voltage primary signal; to the secondary winding of the ignition to receive a high voltage secondary signal; and to a vacuum transducer to receive a signal that is a linear function of the pressure at the intake manifold. Although such connections can be made to CPU 30, for clarity, only the elements connected to CPU 30 in FIG. 1 will be discussed in the remainder of the application.

During execution of the instructions stored in RAM 34, CPU 30 occasionally needs to display values on display 36. To reduce the size requirements for RAM 34, the values that are to be displayed on display 36 are not copied into RAM 34 at "boot up". Instead, the display values remain in PROM 32. To display a value, CPU 30 retrieves the value from PROM 32 and stores it into a display portion of RAM 34. The display portion of RAM 34 is separate from the portion of RAM 34 that contains the executable code.

CPU 30 does not directly control the creation of the images on display 36. Instead, display controller 80 accesses the display portion of RAM 34 to retrieve display values stored by CPU 30. Display controller 80 retrieves the values stored in RAM 34 and delivers the values to display 36 in a manner that allows display 36 to properly display the stored values.

Figure 2:
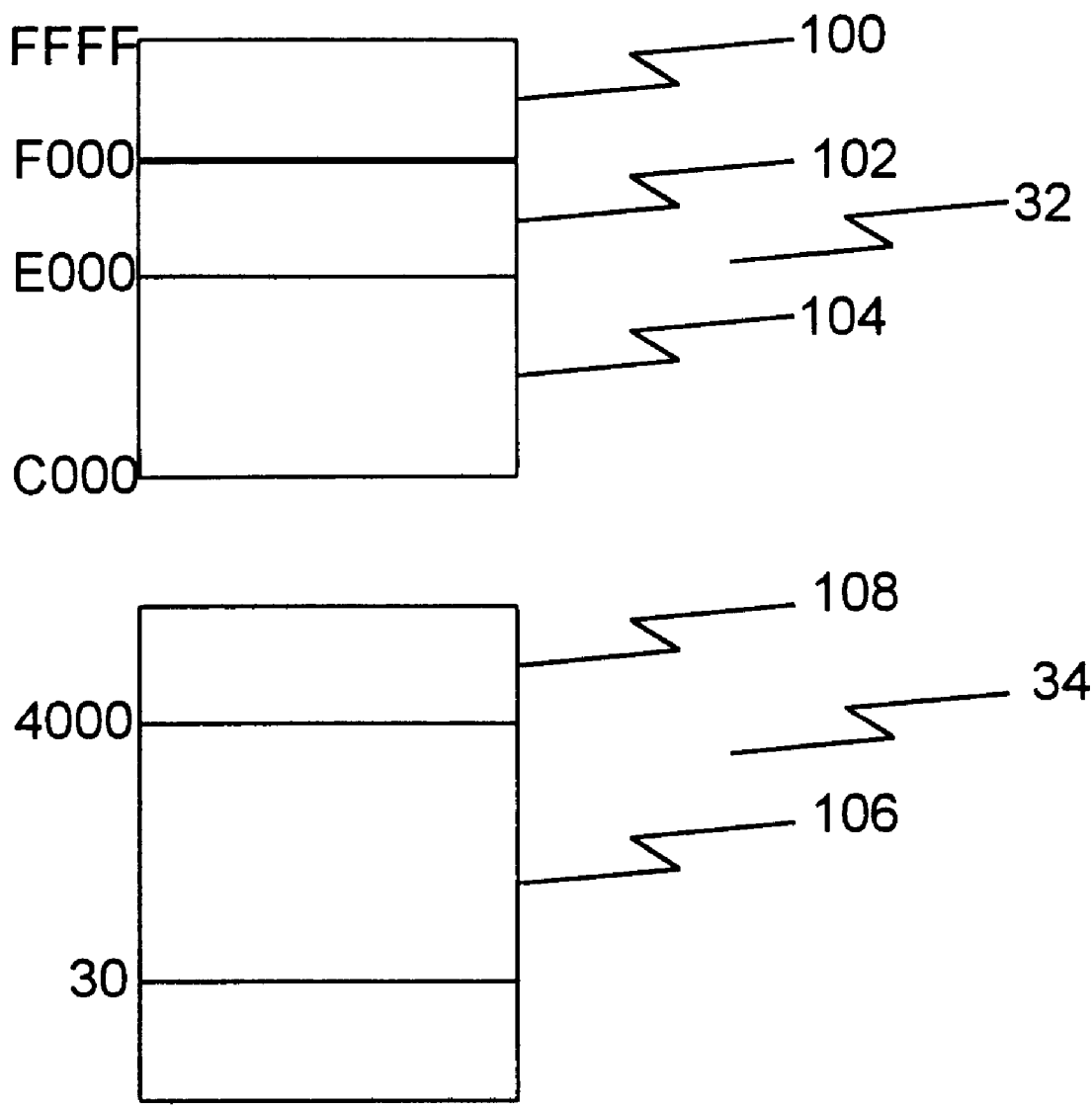
FIG. 2 is a representation of memory allocation for PROM 32 and RAM 34 of FIG. 1.

FIG. 2 is a representation of the memory allocations for PROM 32 and RAM 34 of FIG. 1. Executable code section 100 begins at memory address F000 and ends at memory address FFFF, where the memory address values are in hexadecimal format. Executable code section 100 contains the instructions that are copied from PROM 32 into RAM 34 by CPU 30 of FIG. 1 and that are eventually executed by CPU 30 from RAM 34. In preferred embodiments, the executable code is programmed using the FORTH programming language.

Text strings and database section 102 extends from memory address E000 to EFFF. Section 102 contains text strings and databases. The text strings represent text values to be output on the display. The databases include one or more tables that relate engine components to expected operational limits of the components. For example, the databases may include the relationship between a battery number and the cranking amps expected for that battery model number. The databases can also include tables correlating vehicle models to specific testing equipment. For example, a table can list types of regulator harnesses required for various car models. The values in section 102 are not loaded into RAM 34 at "boot up" but instead are accessed by CPU 30 as needed during the execution of the instructions stored in RAM 34.

Graphic section 104 of PROM 32 begins at memory address C000 and ends at memory address CFFF. Graphic section 104 contains values representing icons, bit maps and graphics that can be placed on display 36 of FIG. 1. The icons represent programs which may be selected by the user. Graphic section 104 also includes diagrams for connecting various test probes to a vehicle for various testing procedures. Graphics section 104, like text string and database section 102, is not loaded into the executable portion of RAM 34 at "boot up". Instead, graphics values are retrieved from graphics section 104 by CPU 30 and delivered to the display portion of RAM 34 as a result of an instruction executed by CPU 30.

RAM 34 has two major memory sections. Executable section 106 starts at memory address 30 and ends at memory address 3FFF. Executable section 106 receives the instructions stored at executable code section 100 of PROM 32 at "boot up". The instructions at executable section 106 are then retrieved by CPU 30 for execution. The second memory section of RAM 34 is display section 108. Display section 108 begins at memory location 4000. The values stored in display section 108 can be retrieved by display controller 80.

In preferred embodiments, the instructions executed by CPU 30 include at least two different types of coding objects. Each of these coding objects can be identified by a memory map that represents a sequential occurrence of addresses in the set of instructions. The sequential set of addresses are grouped into separate fields for each coding object, with each field containing information used to evaluate the coding object.

Figure 3:
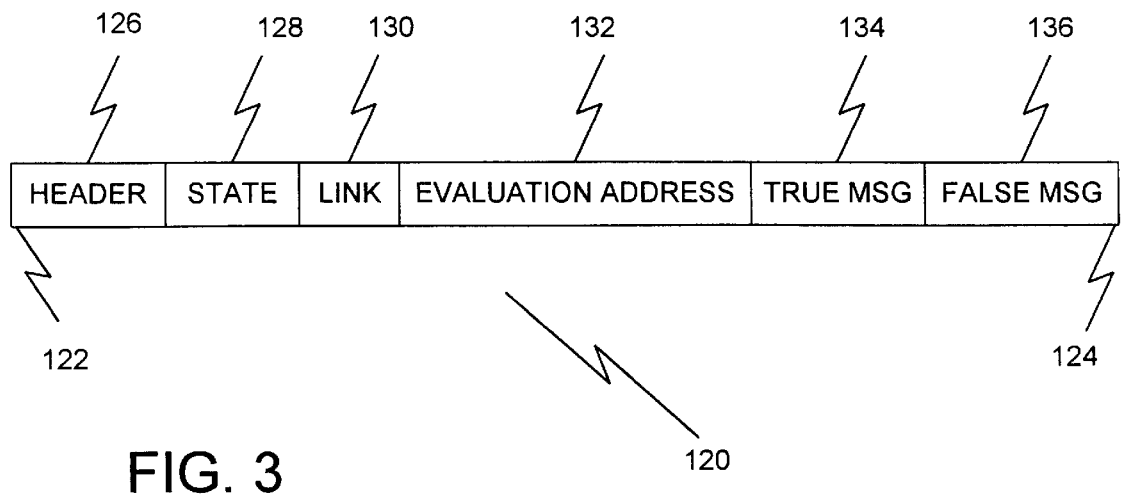
FIG. 3 is a memory map for a DOT coding object.

FIG. 3 shows a memory map for a coding object of a first type, which is referred to as a DOT. DOT 120 has a memory map that begins at beginning address 122 and ends at ending address 124. In preferred embodiments, beginning address 122 is separated from ending address 124 by twelve bytes. DOT 120 is divided into six separate fields. Header 126 is the first field in DOT 120 and it includes information used during compilation such as the name of DOT 120 and the DOT's length. The second field in DOT 120 is state 128. In preferred embodiments, state 128 contains one of three values. A value of true or false in state 128 indicates that the DOT has been evaluated and the result of the evaluation produce the true or false value. A value of "N/A" in state 128 indicates that the DOT has not been evaluated.

Link 130 is the next field after state 128. Link 130 is a pointer address that points to another DOT or to a variable known as DOT-NIL. The address in link 130 is used to link DOTs together to form DOT groups. Such DOT groups are discussed further below in reference to FIGS. 8 and 9.

After link 130, is evaluation address 132. Evaluation address 132 is a pointer address that points to a set of instructions for evaluating the DOT. During evaluation of the DOT, state 128 is modified to either true or false depending upon the results of the evaluation. The evaluation of DOT 120 may cause the execution of other DOTs or other coding objects as described further below.

In the memory map of DOT 120, the next two fields after evaluation address 132 are true message 134 and false message 136. True message 134 and false message 136 are text identifiers that preferably appear as integer numbers. Thus, true message 134 and false message 136 do not contain text or text strings. Instead, the text identifiers of true message 134 and false message 136 identify a text value stored in PROM 32. Based on these text identifiers, CPU 30 can retrieve the proper text value from PROM 32 and deliver it to the display portion of RAM 34. A discussion of the uses for true message 134 and false message 136 are described below in connection with FIG. 6.

It is preferred that at compilation, a reference to a DOT creates a pointer that points to the address of state 128. This allows the state of the DOT to be determined quickly without requiring additional address functions.

Figure 4:
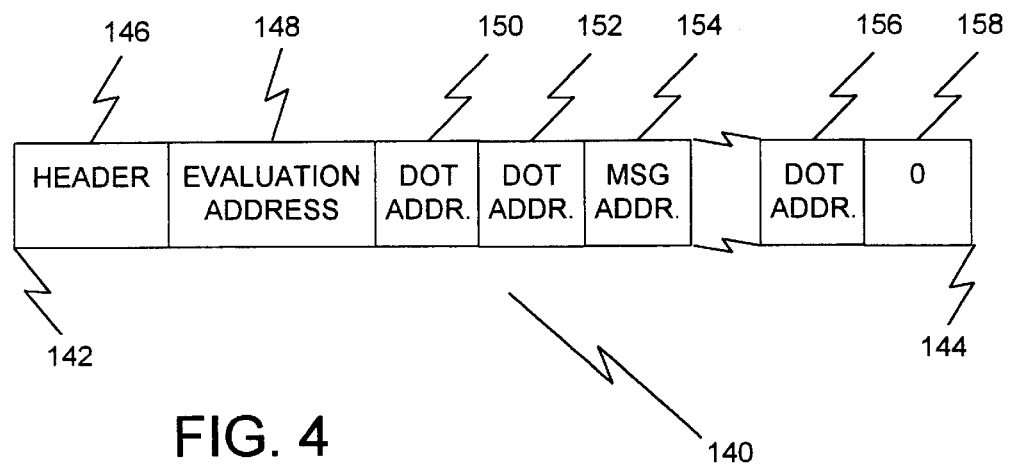
FIG. 4 is a memory map for a SCREEN coding object.

FIG. 4 is a memory map of a SCREEN 140, which is a second type of coding object found in the present invention. SCREEN 140 has a beginning address 142 and an ending address 144. The number of bytes between beginning address 142 and ending address 144 varies, depending on the particular SCREEN definition.

SCREEN 140 includes a header 146 that includes the name and length of the SCREEN. After header 146 is evaluation address 148, which points to an address where SCREEN 140 may be evaluated. After evaluation address 148, SCREEN 140 has a series of DOT addresses 150, 152 and 156; and a text identifier 154. FIG. 4 shows a break between text identifier 154 and DOT address 156. This break indicates that additional DOT addresses or text identifiers may be found within SCREEN 140. The end of SCREEN 140 is marked by end field 158. End field 158 contains a character marking the end of SCREEN 140. In preferred embodiments, this is represented by a zero in end field 158.

The evaluation of SCREENs, such as SCREEN 140, involves retrieving a text identifier from the DOTs addressed in the SCREEN and combining these text identifiers with the text identifiers explicitly listed in the SCREEN. These text identifiers are then used to retrieve text values from PROM 32 so that they may be stored in RAM 34.

Figure 5:
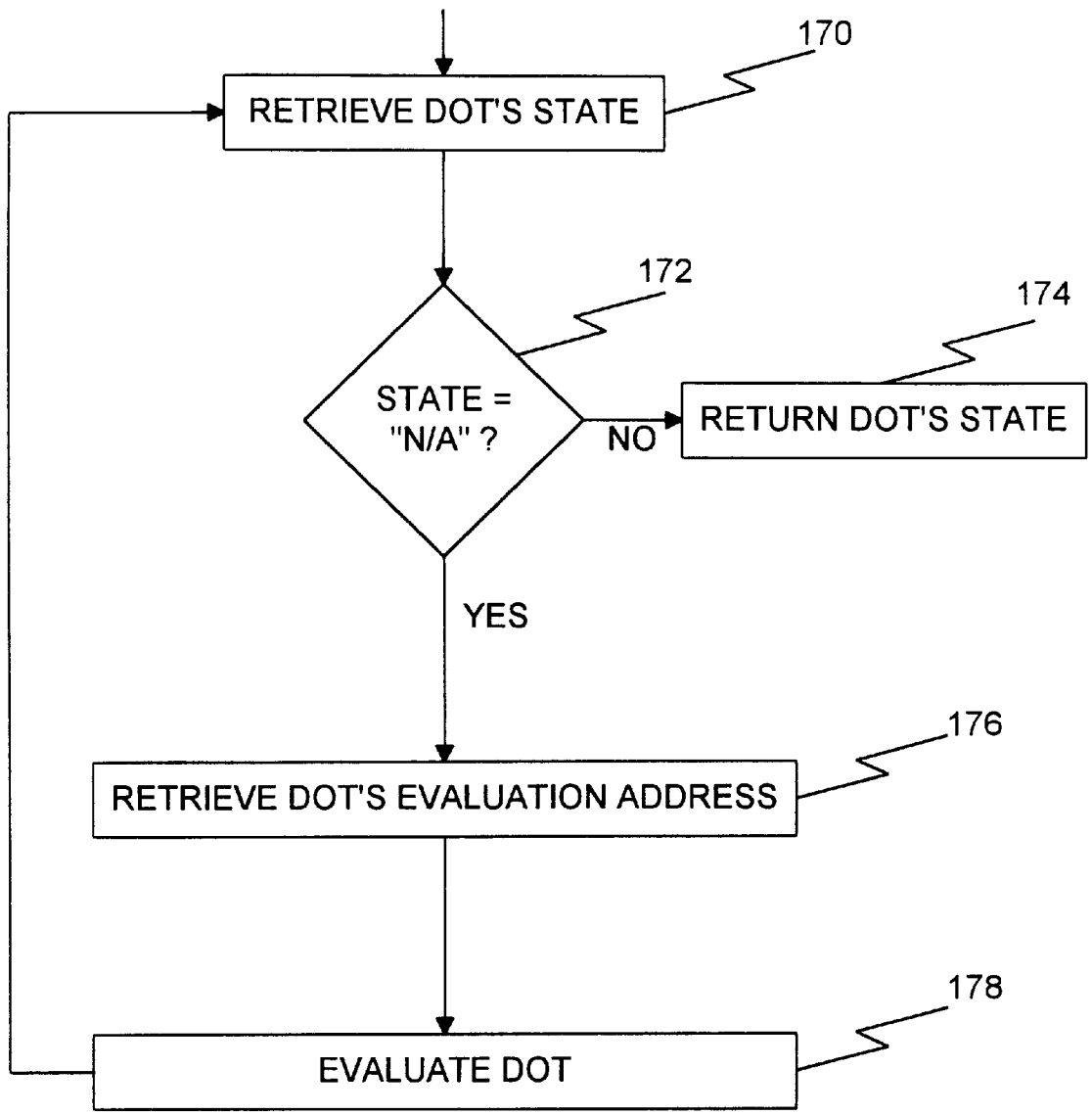
FIG. 5 is a flow diagram for executing a DOT coding object.

FIG. 5 is a flow diagram of the preferable execution steps that CPU 30 follows when a DOT, such as DOT 120 of FIG. 3, is called. Each call to a DOT, such as DOT 120, is referred to as an instance of the DOT and each instance is based on the DOT memory map of FIG. 3. In other words, the memory map of FIG. 3 forms a template for each instance of a DOT. In the flow diagram, the call to the DOT initiates at block 170, where the state of the DOT is retrieved. In preferred embodiments, this is easily achieved because a call to a DOT causes the instruction pointer to point at the DOT state. Thus, to retrieve the DOT state, CPU 30 merely has to retrieve the value stored at the address of the pointer.

After the DOT state is retrieved, the DOT state is compared against the value "N/A" in decision block 172. If the state is not equal to "N/A", the DOT has been previously evaluated. As such, the DOT does not need to be reevaluated and the DOT state is returned to the calling routine at block 174. If the DOT state is equal to "N/A", the DOT has not been evaluated. To evaluate the DOT, the DOT's evaluation address must be retrieved from the DOT. This occurs at block 176, where the evaluation address of this instance of the DOT is retrieved based on the DOT memory map of FIG. 3. Once the evaluation address has been retrieved, the instruction pointer is changed to the evaluation address and the DOT is evaluated at block 178. After the DOT has been evaluated, the DOT's state should change due to the evaluation. Once the DOT has been evaluated, the DOT's state is retrieved once again in block 170 and compared against state "N/A" in decision block 172. The loop described above continues until the DOT state is either true or false.

Figure 6:
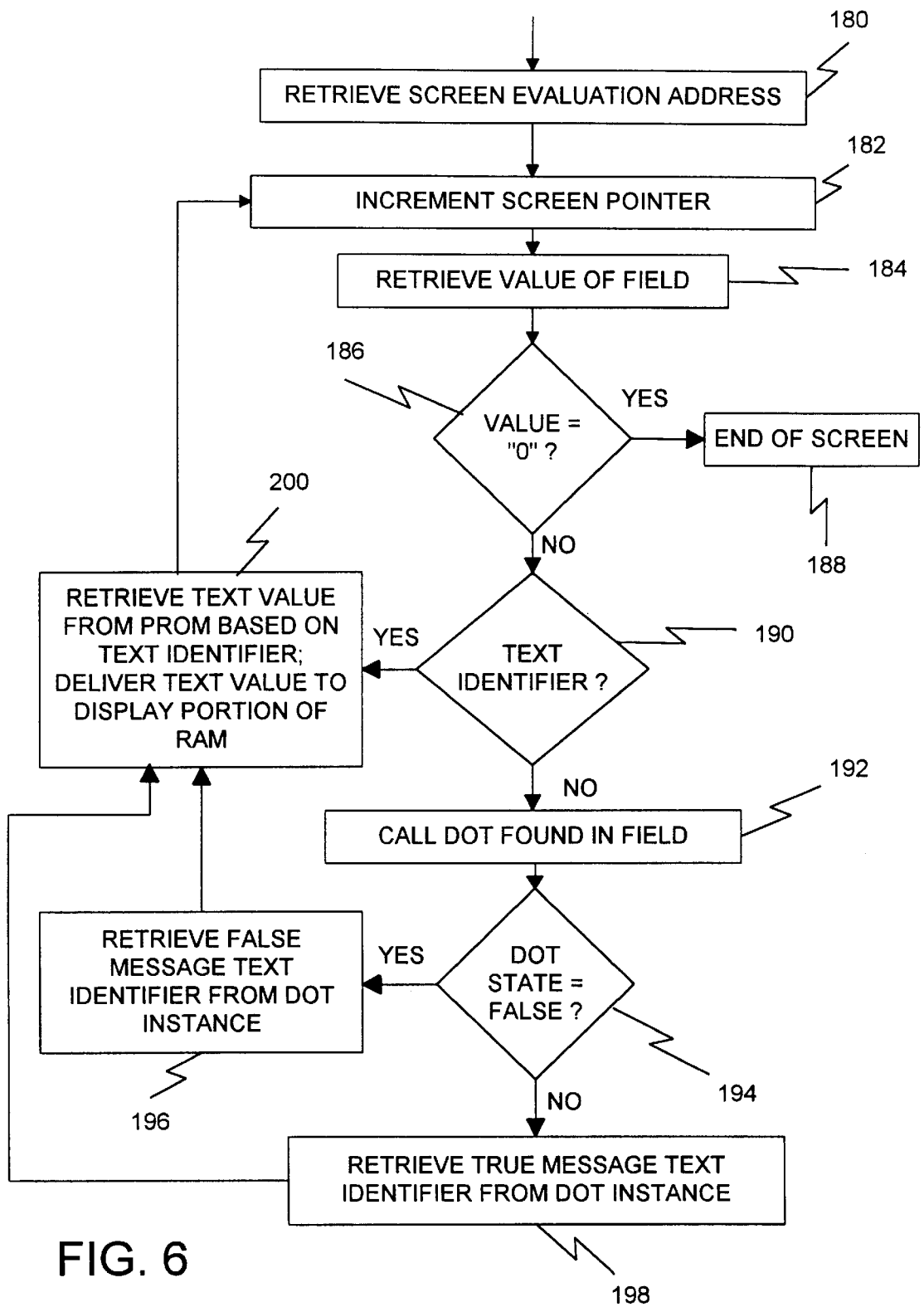
FIG. 6 is a flow diagram for executing a SCREEN coding object.

FIG. 6 is a flow diagram of the evaluation of a SCREEN coding object such as SCREEN 140. The flow diagram of FIG. 6 is for a specific SCREEN coding object and other SCREEN coding objects may have slightly different flow diagrams.

After the SCREEN is called, the SCREEN evaluation address is retrieved in block 180. The first step at the evaluation address for the SCREEN is to increment a pointer so that it points at one of the DOT address fields or text identifier fields found in the SCREEN. This is shown in block 182 of FIG. 6. The value of the field pointed to by the pointer is then retrieved in block 184. This value is compared against zero to determine if the end of the SCREEN is reached in decision block 186. If the end of the SCREEN has been reached, execution ends at block 188 and control returns to the instruction that called the SCREEN.

If the value retrieved from the SCREEN is not equal to zero, it is checked in decision block 190 to determine if it is a text identifier. If it is a text identifier, the text identifier is used to retrieve a text value from PROM 32. This text value is then delivered to the display portion of RAM 34 so that it may be displayed on display 36.

If, at decision block 190, the value retrieved from the SCREEN instance is not a text identifier, the value must be a DOT address. In block 192, this DOT address is used to call the DOT, which causes the execution of the flow diagram found in FIG. 5. At the end of that execution, the DOT's state field is set to a state of either true or false. In decision block 194, the state of the DOT is tested. If the state is false, the false message text identifier is retrieved from the DOT's instance. If the state is true, the true message text identifier is retrieved from the DOT's instance at block 198. In either case, the respective message text identifier retrieved in either block 196 or block 198 is used to retrieve a text value from the PROM 32 in block 200. This text value is delivered to the display portion of RAM 34 so that the text may be displayed by display 36. After the text value has been stored in RAM 34, the SCREEN pointer is once again incremented at block 182. The loop described above continues until the end of the SCREEN instance is reached at decision block 186.

Through this process of execution, a SCREEN coding object is able to produce a composition of text messages that can be placed on display 36. The fact that the text values are stored in a separate portion of PROM 32 from the execution code, means that the language of the text messages can be changed without modifying the execution code. This greatly reduces the chances that the execution code will become corrupted when the text messages are changed.

Figure 7:
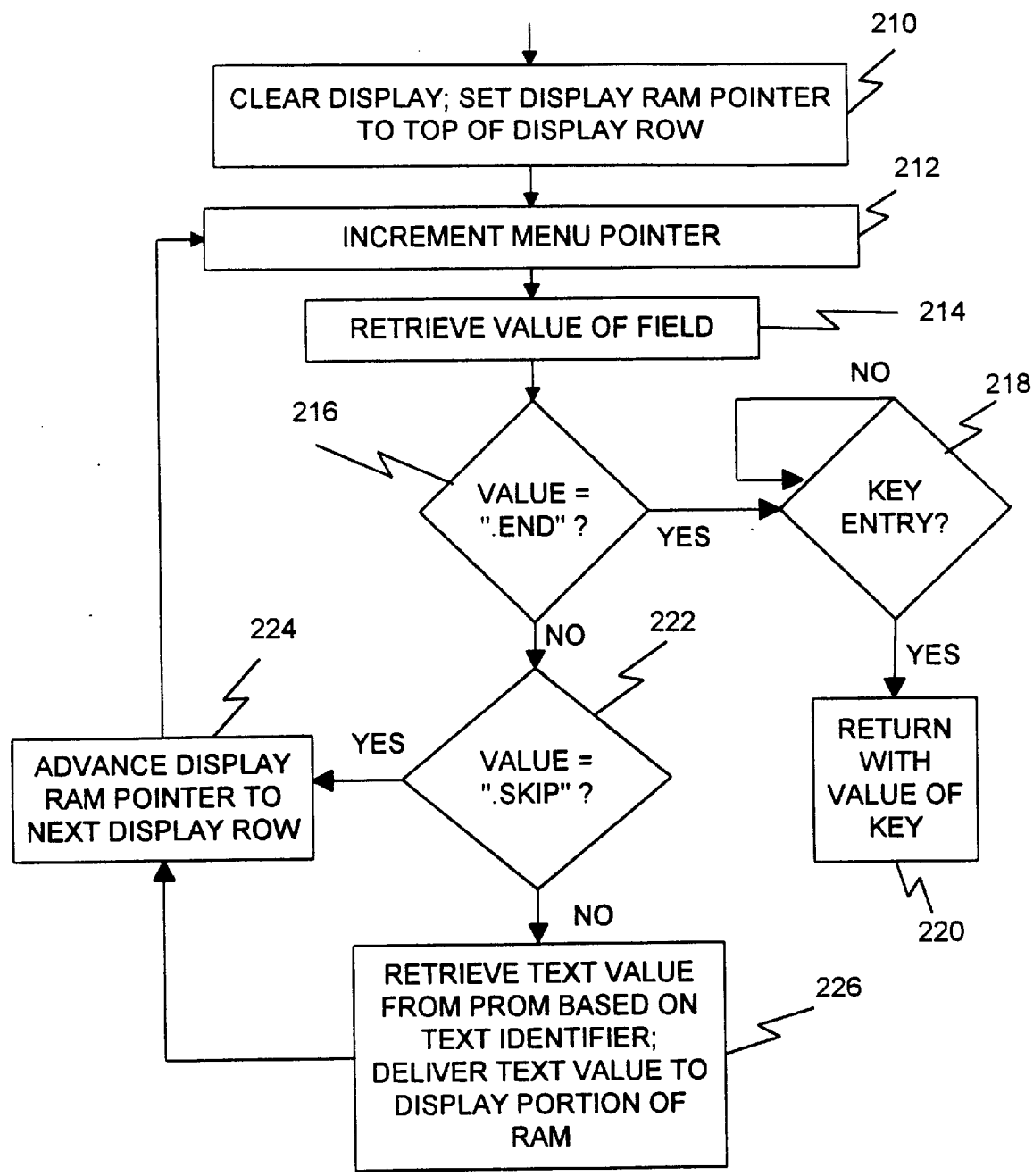
FIG. 7 is a flow diagram for executing a MENU coding object.

FIG. 7 shows a flow diagram for a special version of the SCREEN coding object called a MENU. When the MENU is called, it first clears the display and resets a variable containing a display RAM address so that the variable points at an address representing the top of the display. This is shown in block 210. Execution continues with the advancement of the MENU's pointer in block 212. A value stored at the address pointed to by the pointer is retrieved in block 214. If the retrieved value equals ".END" at decision block 216, the end of the MENU has been reached. Execution then enters a loop waiting for a key to be pressed at decision block 218. Once a key is pressed, execution continues at block 220, where the value of the key is returned to the routine that called the MENU. If the value retrieved from the MENU does not equal ".END" at decision block 216, it is compared with ".SKIP" at decision block 222. If the value equals ".SKIP", the display RAM address pointer is advanced so that it points at an address representing the next row of displayable values. This is shown in block 224.

If the value retrieved from the MENU is not equal to ".SKIP" at decision block 222, it is a text identifier. In block 226, the text identifier is used to retrieve a text value from PROM 32 of FIG. 1. The retrieved text value is stored in RAM 34 at the address pointed to by the display RAM pointer. After the value is stored, the display RAM pointer is advanced so that it points at an address representing the beginning of the next row of the display.

After the display RAM pointer has been advanced at block 224, the MENU pointer is advanced again at block 212. The loop described above continues until the retrieved value equals ".END" at decision block 216.

The MENU shown in FIG. 7 can be used to request information from the user. Although the MENU described in FIG. 7 reacts to a single key entry, it can be modified to allow entry of multiple values.

Figure 8:
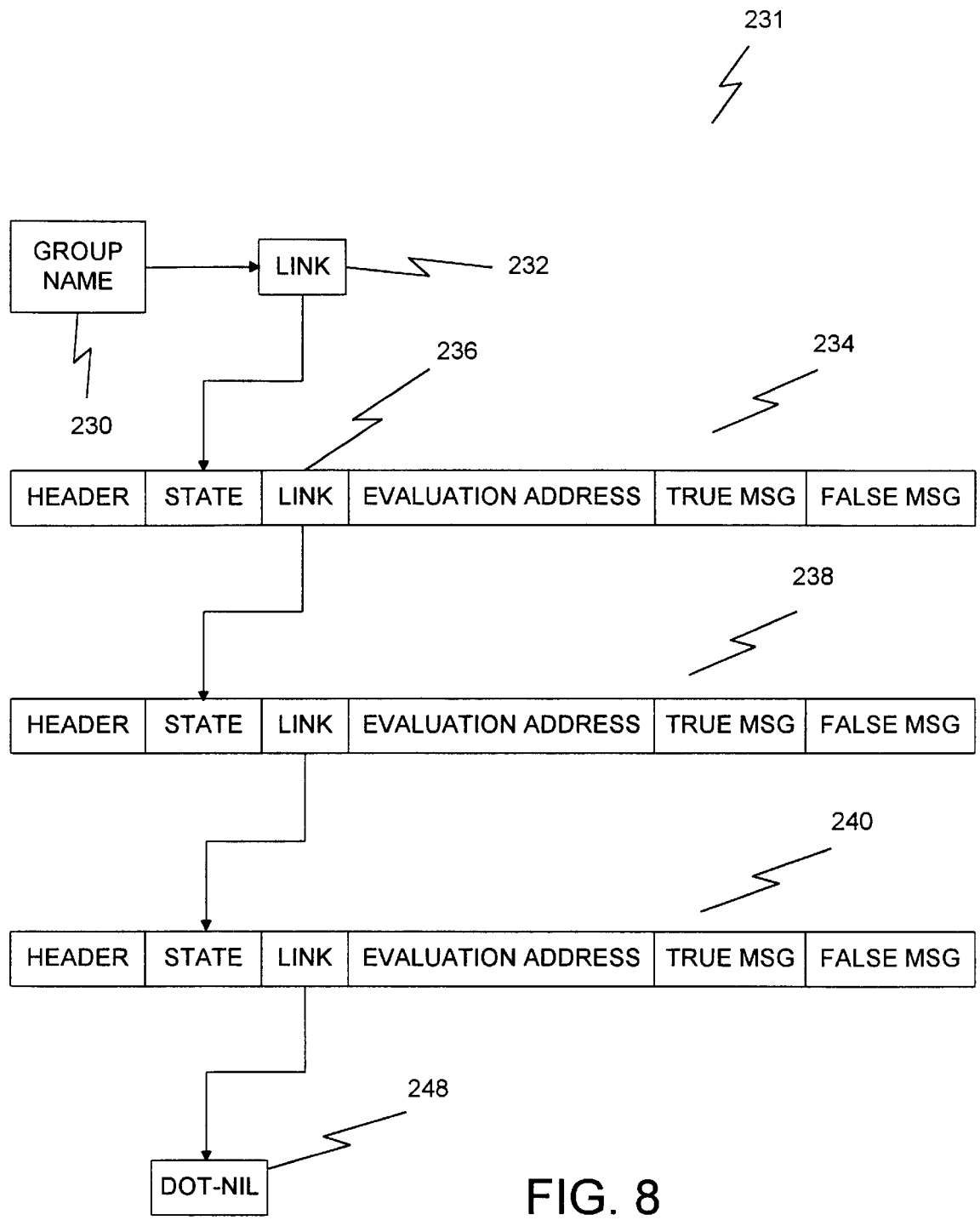
FIG. 8 is a representation of DOTs linked together in a DOT group.

FIG. 8 shows a representation of a linked DOT group 231 consisting of three separate DOTs: DOT 234, DOT 238, and DOT 240. The DOT group is referred to by a DOT group name 230. When the DOT group name 230 is compiled, it is converted into an address that points to link 232. Link 232 contains the address of the DOT state for DOT 234. Link field 236 of DOT 234 contains the address of the state field for DOT 238 and the link field of DOT 238 includes the address of the state field for DOT 240. Thus, all three DOTs are linked together. The link field for DOT 240 includes the address of the variable DOT-NIL shown in block 248. The DOT that has a link field addressing DOT-NIL is the last DOT in the DOT group.

The linked nature of the DOTs in a DOT group, such as DOT group 231, can be used to reset all of the DOTs in a DOT group. A DOT is reset by having its state set back to "N/A", so that when the DOT name is called, the DOT will be reevaluated. This can be done when testing begins on a new vehicle or when the operator wishes to retest a parameter of the vehicle.

Figure 9:
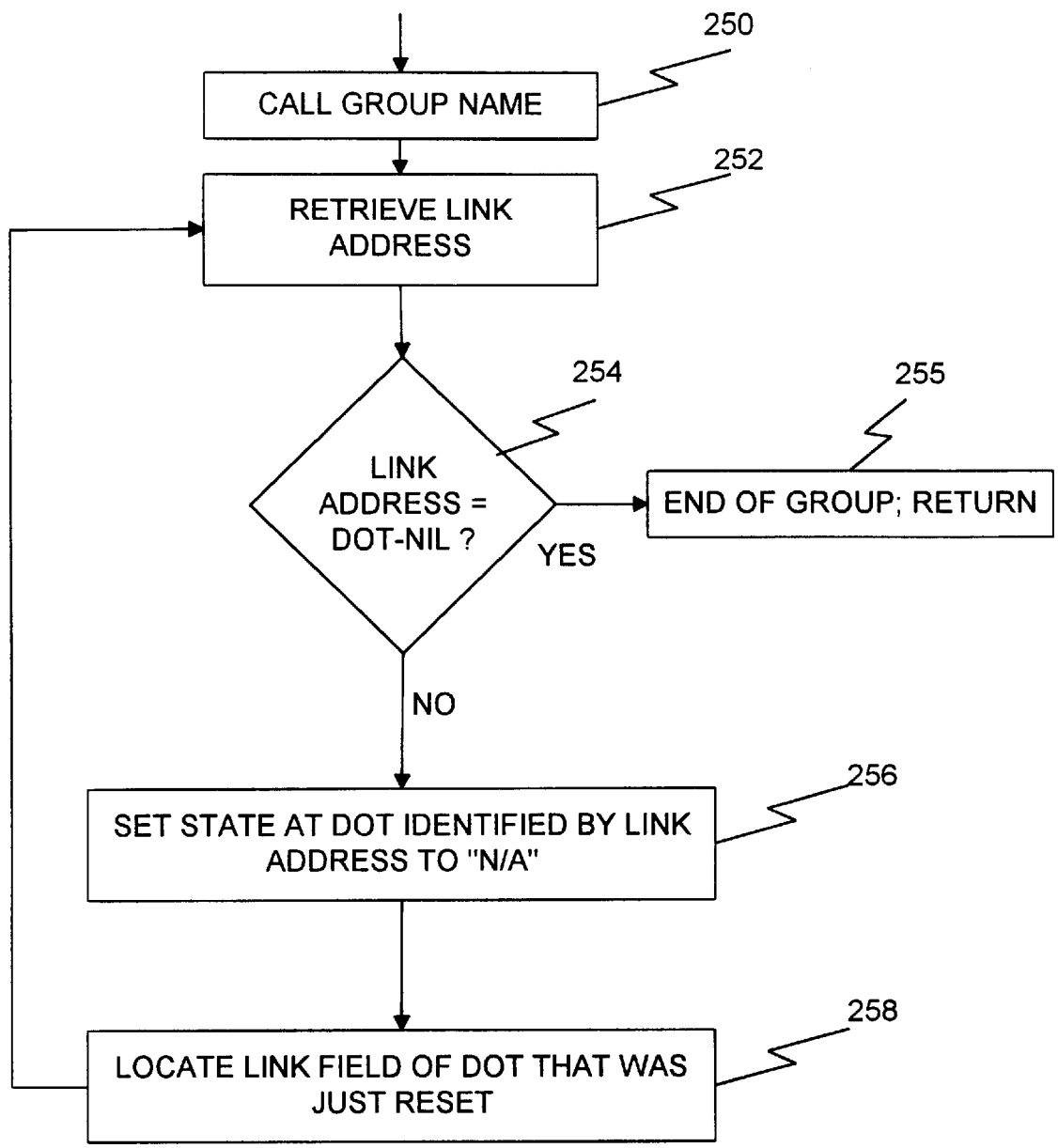
FIG. 9 is a flow diagram for resetting a DOT group.

FIG. 9 shows a flow diagram for resetting all of the DOTs in a DOT group. A call to the group name at block 250 places a pointer at the address corresponding to the group name. The link address stored at the group name address is retrieved at block 252. The link address is compared to the variable DOT-NIL in decision block 254. If the link address is equal to DOT-NIL, the pointer is at the end of the group, and at block 255, control is returned to the instruction that called the group name. If the link address is not equal to DOT-NIL, the state identified by the link address is set to "N/A" at block 256. This resets the DOT identified by the link address so that the DOT will be reevaluated the next time it is called.

Once the state is reset, execution continues at block 258, where the link field of the DOT that was just reset is located. This link field is then used in block 252 to retrieve the next link address. CPU 30 continues to cycle through the linked DOTs, resetting each DOT in the group, until a retrieved link address equals DOT-NIL.

Figure 10:
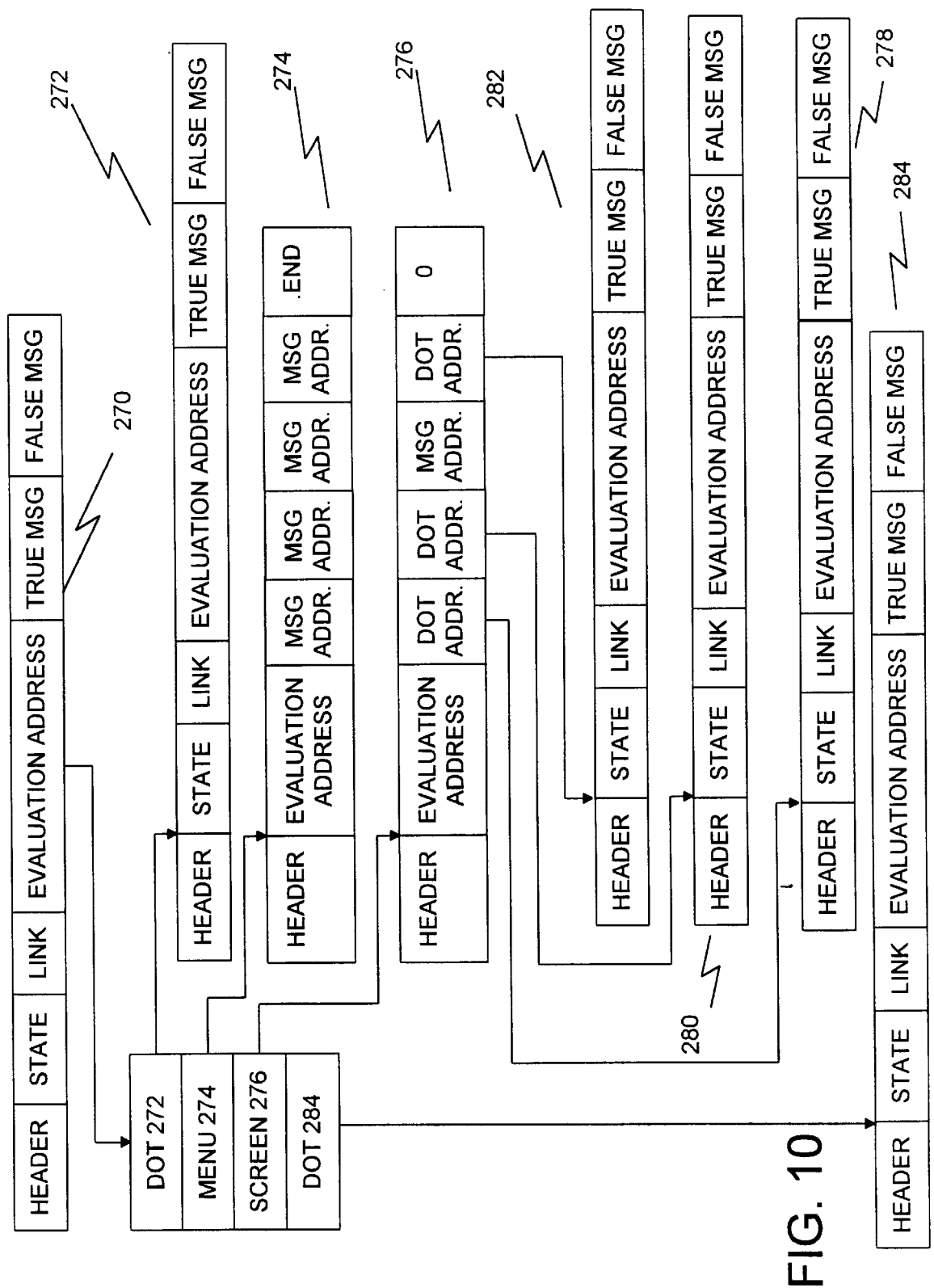
FIG. 10 is a representation of the expansion of a DOT.

FIG. 10 is a graphical representation of a possible expansion caused by the execution of a DOT 270. Evaluation of DOT 270 begins at its evaluation address. In the example shown in FIG. 10, the evaluation of DOT 270 includes a call to DOT 272. After DOT 272 is executed, and its state updated, control is returned to the evaluation routine of DOT 270.

The evaluation routine then calls MENU 274. MENU 274 is executed in a manner similar to that described for MENUs in FIG. 7 and the key value retrieved by MENU 274 is returned to the evaluation routine of DOT 270.

DOT 270 also includes a call to SCREEN 276. SCREEN 276 includes a call to DOTs 278, 280, and 282. The execution of DOTs 278, 280, and 282 can be used by SCREEN 276 to modify the message presented to the user depending on the values returned by DOTs 278, 280, and 282. This allows the vehicle diagnostic system to change the duration or type of test performed by the mechanic based on the current state of the vehicle. After SCREEN 276 has executed, control is returned to DOT 270 where sometime later DOT 284 is executed. Although only DOT 272, MENU 274, SCREEN 276, and DOT 284 are shown at the evaluation address of DOT 270, those skilled in the art will recognize that other coding instructions (not shown) are present at the evaluation address of DOT 270. These additional coding instructions can be written to control the evaluation of DOT 270 and to update the state of DOT 270 in light of the results of the evaluation of the coding objects listed in FIG. 10.

FIG. 10 is significant because it shows that DOTs can be called by SCREENs and that DOTs can also call SCREENs. This gives a great deal of flexibility in preparing new instructions for the vehicle diagnostics system. In addition, the fact that a DOT is only evaluated if it has not been previously evaluated, allows greater flexibility in coding because two separate DOTs may call the same coding object without fear of redundantly executing a DOT. This is especially important in a vehicle diagnostics system in which separate diagnostic routines may require identical information.

For example, if a vehicle will not start, it is possible that the starter is faulty or the ignition is faulty. With the present invention, standard routines may be written for determining whether a starter is faulty or whether an ignition system is faulty. As part of both of these routines, a first step may be to question whether the battery is providing enough voltage for the ignition or the starter respectively. If the root fault of a faulty starter and a faulty ignition are tested sequentially, the test for the battery voltage will only have to be evaluated once. The second time the battery DOT is called, it will return its state without being evaluated. This greatly reduces the time needed to diagnose or evaluate the status of a vehicle.

Although the present invention has been described with reference to preferred embodiments, workers skilled in the art will recognize that changes may be made in form and detail without departing from the spirit and scope of the invention.

What is claimed is:

1. A vehicle diagnostic system comprising:
    a processing unit for coupling to a vehicle, the processing unit for executing instructions and for receiving signals from a vehicle;
    a long-term memory, coupled to the processing unit, the long-term memory storing instructions to be executed by the processing unit and storing display values capable of being translated into a perceivable output, the instructions to be executed by the processing unit including coding objects of a first type, the coding objects of the first type capable of calling other coding objects of the first type during execution, each coding object of the first type having a state field and the coding object of the first two returning a state from the state field without executing when the state field indicates that the coding object has been previously executed;
    a random access memory, coupled to the processing unit, the random access memory for receiving a copy of instructions stored in the long-term memory to form a source of instructions for the processing unit to execute, at least one coding object of the first type copied into the random access memory including a reference to a display value stored in the long-term-memory; and
    a user interface, coupled to the random access memory, the user interface for retrieving display values from a portion of the random access memory and for creating a perceivable output based on the retrieved display values.

2. The vehicle diagnostic system of claim 1 wherein a display value retrieved by the user interface represents a description of a fault in the vehicle.

3. The vehicle diagnostic system of claim 1 wherein a display value retrieved by the user interface represents a description of a vehicle component operating properly.

4. The vehicle diagnostic system of claim 1 wherein at least one coding object of the first type has at least one associated display identifier, the display identifier representing an address for a respective display value in the long-term memory.

5. The vehicle diagnostic system of claim 4 wherein a first display identifier is retrieved from a coding object when the coding object evaluates to a first value and a second display identifier is retrieved from the coding object when the coding object evaluates to second value.

6. The vehicle diagnostic system of claim 4 wherein a coding object of a second type causes a plurality of display values to be delivered to the display portion of the random access memory, the plurality comprising at least one display value represented directly in the coding object of the second type by a display identifier, at least one other display value represented by a display identifier retrieved from a coding object of the first type.

7. The vehicle diagnostic system of claim 6 wherein a coding object of the first type calls a coding object of the second type during execution.

8. The vehicle diagnostic system of claim 7 wherein coding objects of the first type call coding objects of the first type and coding objects of the second type during execution.

9. The vehicle diagnostic system of claim 8 wherein the state field of a coding object is capable of being reset so that it no longer indicates that the coding object has been executed.

10. The vehicle diagnostic system of claim 9 wherein coding objects of the first type are associated with coding object groups, the respective state field in each coding object in a coding object group capable of being reset by reference to the coding object group.

11. The vehicle diagnostic system of claim 1 wherein a display value in long-term memory is capable of being altered without changing instructions stored in long-term memory.

12. The vehicle diagnostic system of claim 11 wherein a display value is capable of being altered from one written language to another written language.

13. A process of evaluating a vehicle parameter, the process comprising:
    executing a set of computer instructions, the set of computer instructions comprising coding objects of a first type containing text string identifiers, the set of instructions further comprising instructions for either retrieving or not retrieving text strings from a long-term memory based on at least one text string identifier; and performing tests on the vehicle based on text strings produced by the computer instructions.

14. The process of claim 13 wherein a first text string identifier is retrieved from a coding object when the coding object evaluates to a first state and a second text string identifier is retrieved from a coding object when the coding object evaluates to a second state.

15. The process of claim 14 further comprising coding objects of a second type, coding objects of the second type comprising lists of text string identifiers and invocations of coding objects of the first type.

16. The process of claim 15 wherein execution of coding objects of the second type causes a list of text strings to be retrieved from long-term memory, at least one of the text strings resulting from the invocation of a coding object of the first type.

17. The process of claim 13 wherein at least one text string indicates a condition for a vehicle parameter.

18. The process of claim 15 wherein coding objects of the first type invoke coding objects of the second type.

19. The process of claim 18 wherein a coding object of the first type contains a state value, the state value changing when the coding object is executed, the state value preventing the coding object from being executed more than once before the state value is reset.

20. The process of claim 19 wherein coding objects of the first type are associated with coding groups such that all of the coding objects of a coding group are capable of having their state value reset by reference to the coding group.

21. The process of claim 13 wherein text strings in the long-term memory are capable of being altered without affecting the computer instructions.

22. The process of claim 21 wherein the text strings in the long-term memory are capable of being converted from a first written language to a second written language.

* * * * *